US006622121B1

United States Patent
Crepy et al.

(10) Patent No.: US 6,622,121 B1
(45) Date of Patent: Sep. 16, 2003

(54) TESTING SPEECH RECOGNITION SYSTEMS USING TEST DATA GENERATED BY TEXT-TO-SPEECH CONVERSION

(75) Inventors: Hubert Crepy, Boulogne (FR); Jeffrey A. Kusnitz, Santa Clara, CA (US); Burn Lewis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 09/634,179

(22) Filed: Aug. 9, 2000

(30) Foreign Application Priority Data

Aug. 20, 1999 (EP) .............................. 99480079

(51) Int. Cl.[7] .......................... G10L 15/06; G10L 13/08
(52) U.S. Cl. ...................... 704/243; 704/260; 704/251
(58) Field of Search ................... 704/251, 243, 704/260

(56) References Cited

U.S. PATENT DOCUMENTS

| | | | |
|---|---|---|---|
| 4,349,700 A | 9/1982 | Pirz et al. | |
| 4,783,803 A | 11/1988 | Baker et al. | |
| 5,313,531 A | 5/1994 | Jackson | |
| 5,572,570 A * | 11/1996 | Kuenzig | ..................... 379/1.02 |
| 5,615,299 A | 3/1997 | Bahl et al. | |
| 5,652,828 A | 7/1997 | Silverman | |
| 5,715,369 A * | 2/1998 | Spoltman et al. | ........... 704/270 |
| 5,751,904 A | 5/1998 | Inazumi | |
| 5,754,978 A | 5/1998 | Pérez-Méndez et al. | |
| 5,758,320 A | 5/1998 | Asano | |
| 5,799,278 A | 8/1998 | Cobbett et al. | |
| 5,806,037 A | 9/1998 | Sogo | |
| 5,826,232 A | 10/1998 | Gulli | |
| 5,878,390 A | 3/1999 | Kawai et al. | |
| 5,884,251 A | 3/1999 | Kim et al. | |
| 5,890,117 A | 3/1999 | Silverman | |
| 5,899,972 A | 5/1999 | Miyazawa et al. | |
| 6,119,085 A * | 9/2000 | Lewis et al. | ................. 704/260 |

* cited by examiner

Primary Examiner—Tālivaldis Ivars Šmits
(74) Attorney, Agent, or Firm—Thu Ann Dang

(57) ABSTRACT

Methods and systems for testing speech recognition systems are disclosed in which the speech recognition device to be tested is directly monitored in accordance with a text-to-speech device. The collection of reference texts to be used by the speech recognition device is provided by a text-to-speech device preferably, in one embodiment, implemented within the same computer system. In such an embodiment, a digital audio file stored within a storage area of a computer system is generated from a reference text using a text-to-speech device. The digital audio file is later read using a speech recognition device to generate a decoded (or recognized) text representative of the reference text. The reference text and the decoded text are compared in an alignment operation and an error report representative of the recognition rate of the speech recognition device is finally generated.

13 Claims, 5 Drawing Sheets

TESTING SPEECH RECOGNITION SYSTEMS USING TEST DATA GENERATED BY TEXT-TO-SPEECH CONVERSION

FIELD OF THE INVENTION

The present invention relates to speech recognition systems and, more particularly, to methods and systems for testing speech recognition systems.

BACKGROUND OF THE INVENTION

Speech recognition is an important aspect of furthering man-machine interaction. The end goal in developing speech recognition systems is to replace the keyboard interface to computers with voice input. This may make computers more user friendly and enable them to provide broader services to users. To this end, several systems have been developed. The effort for the development of these systems aims at improving the transcription error rate on real speech in real-life applications. In the course of developing these systems, one needs to compare different approaches by running tests over standardized test data which are generally recorded speech of a reference script.

The reason for this is that for fair comparisons and reproducible results, it is essential that all experiments be carried out with exactly the same speech input. Therefore, all systems will be tested by the same speakers reading the same script (text or voice commands). Since it is impossible for a speaker to utter the words twice in exactly the same way, and since the background noise would also change from utterance to utterance, the test speech data is recorded once and for all, and then reused for all the tests.

In particular when the objective is to test the resilience of the system to dictation of very varied texts, to obtain any kind of statistically significant results, it becomes necessary to record very large bodies of text corpora spoken by the test speaker(s).

Recording of this large amount of text is commonly realized by a human speaker (or a set of human speakers) who reads reference texts to a microphone in a controlled fashion. The main drawback of human dictation is that the collecting thereof is costly in that it is very labor-intensive to record a massive amount of test material in a controlled fashion.

As a consequence of the foregoing difficulties in the prior art, it is an object of the present invention to provide speech recognition systems and methods wherein the test speech material is provided independently of a human speaker.

SUMMARY OF THE INVENTION

The present invention solves the foregoing need by providing systems and associated methods for testing speech recognition systems in which the speech recognition device to be tested is directly monitored in accordance with a text-to-speech device. The collection of reference texts to be used by the speech recognition device is provided by a text-to-speech device preferably implemented within the same computer system.

In one embodiment of the invention, the method comprises the steps of:
a) generating a digital audio file from a reference text using a text-to-speech device, the digital audio file being stored within a storage area of a computer system; and
b) reading the digital audio file using a speech recognition device to generate a decoded text representative of the reference text.

It is known that the phrase "decoded text" may be used interchangeably with the phrase "recognized text."

In a further step, alignment of the reference text and the decoded text is accomplished and an error report representative of the recognition rate of the speech recognition device is generated.

Preferably, the step of generating a digital audio file is realized by:
a1) tokenizing an initial text stored on a storage area of the computer system to generate a tokenized text;
a2) marking-up of the tokenized text to generate a marked text; and
a3) synthesizing the marked text to generate the digital audio file.

In an alternate embodiment, the text-to-speech device is implemented within a first computer system while the speech recognition device is implemented within a second computer system. The method then comprises the steps of:
a) generating a synthetic speech from a reference text using the text-to-speech device; and
b) processing the synthetic speech to generate a decoded text representative of the reference text using the speech recognition device.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
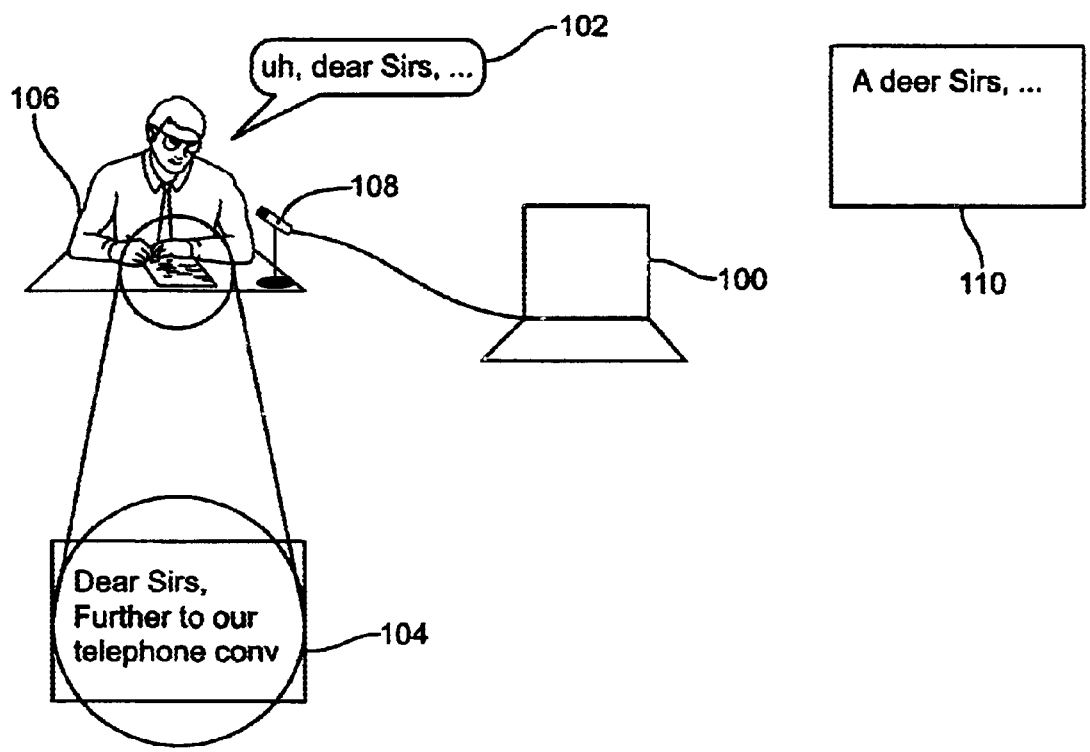
FIG. 1 is a schematic block diagram of a typical test speech recognition system.

Referring now to the drawings, and more particularly to FIG. 1, a schematic block diagram of a typical test speech recognition system is depicted.

A speech recognition device 100 receives as its input, signals representing the dictation 102 of a reference text 104 that is read by a human speaker 106 into a microphone 108. The microphone may be either integrated within the speech recognition device or may be external as shown on FIG. 1. The input signals are processed by a speech recognition method to output a decoded text 110. For example, the recognition method may be implemented as software running on a workstation. The decoded text may be displayed on a screen of the workstation either for editing or for further processing such as measurement of the word error rate.

As already stated, the drawback of this 'live' test is that the results are not reproducible since the human speaker cannot possibly utter a text exactly the same twice.

In an alternative, the speaker's voice may be first recorded onto conventional storage media of the workstation (such as fixed disk drive or floppy disk drive). On a further operation, the recorded reference text may be sent to a speech recognition device for recognition and the decoded text may be later used for measuring the performance of the speech recognizer. Although in this 'off-line' testing alternative, the recorded reference text may be used several times, there still exits the aforementioned drawbacks of initial speaker mistakes such as dysfluencies, hesitations, stuttering or mouth noise. Moreover, the control of various speech parameters such as delivery speed or pitch, useful for the statistical measurements, is limited to the human capabilities. Additionally, the first recording may still be surrounded by undesirable background noise. Finally, recording lengthy dictation sessions from a human speaker with consistent quality is expensive and time-consuming.

Figure 2:
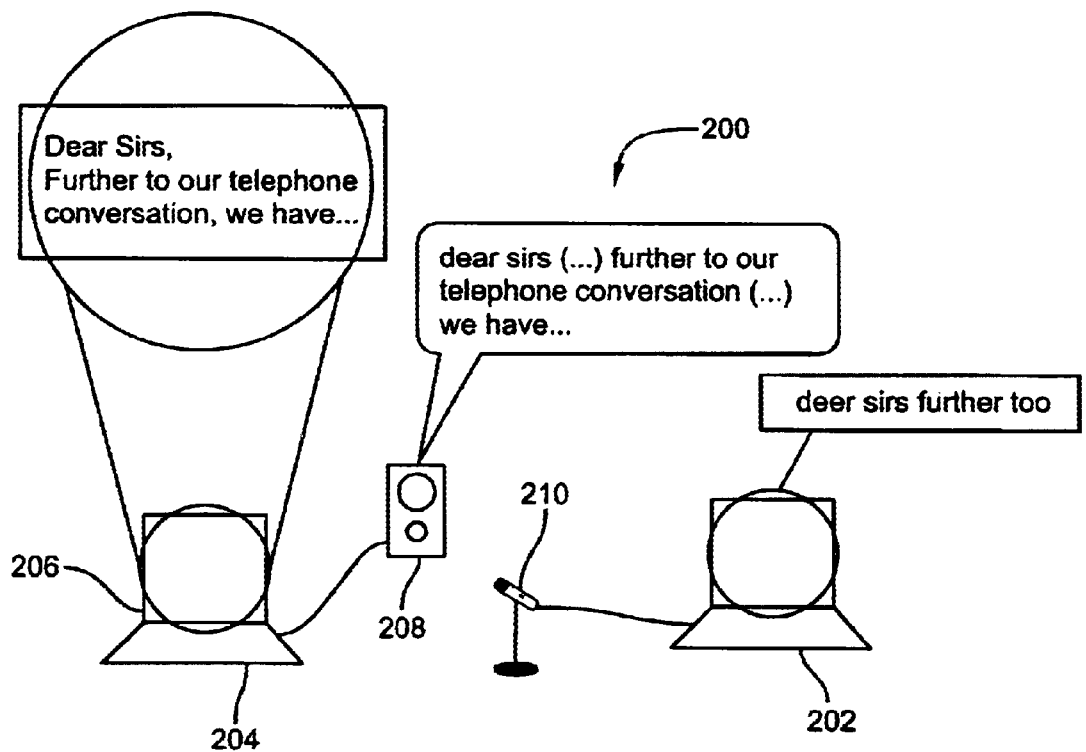
FIG. 2 is a schematic block diagram of one embodiment of the present invention.

FIG. 2 is a block diagram of a speech recognition test system 200 in accordance with a first embodiment of the invention. The system is composed of a speech recognition device 202 and a text-to-speech device 204. The speech recognizer 202 may be a conventional one as described with reference to FIG. 1; or as described for example in patents: U.S. Pat. Nos. 5,313,531; 5,615,299 and 5,799,278, from the same assignee, the disclosures of which are incorporated by reference herein; or in the several following patents: U.S. Pat. Nos. 4,349,700; 4,783,803; 5,751,904; 5,754,978 and 5,878,390, the disclosures of which are incorporated by reference herein. It is to be noted that a number of speech recognition devices are described in the literature or in patents and that the above mentioned patents are not to be considered to limit the invention to those systems.

The text-to-speech device 204 includes a computer 206 programmed to carry out the functions of voice synthesis and an output device 208 to produce a reference synthetic speech aloud. It is readily obvious that the output device may be a common loudspeaker coupled via an appropriate interface to the computer or directly incorporated into it.

Generally speaking, in operation, the text-to-speech device 204 restores aloud a reference text that is stored as a data file in the computer. This reference synthetic speech is then captured by an input device 210 of the speech recognizer as it would be a human reading. Once the audio is generated using the text-to-speech device, the speech recognizer uses the audio to generate a decoded text representing the initial reference text. The decoded text which is stored either in a buffer storage or displayed on a screen of a computer system on which the speech recognition device is implemented, is then processed to measure the performance of the speech recognizer.

It is to be noted that the audio produced by the text-to-speech system sounds as natural as possible, simulating a human dictating a text aloud. For example, punctuation symbols are read aloud, surrounded by short pauses, and speech prosody is inserted within the sentences.

The method and apparatus of the present invention are advantageous because they overcome the limitations of the prior art by suppressing the drawbacks of human speakers and improving the accuracy of the tests performed on the speech recognizer. Moreover, they are time efficient and can be used over an extended period of time without worsening quality.

It should be understood that any text-to-speech system is suitable to operate the invention. A more complete description of such systems is to be found in the following references: U.S. Pat. Nos. 5,652,828; 5,758,320; 5,806,037; 5,826,232; 5,884,251; 5,890,117; and 5,899,972, the disclosures of which are incorporated by reference herein, which may not be interpreted as limiting the invention to the use of these systems.

Figure 3:
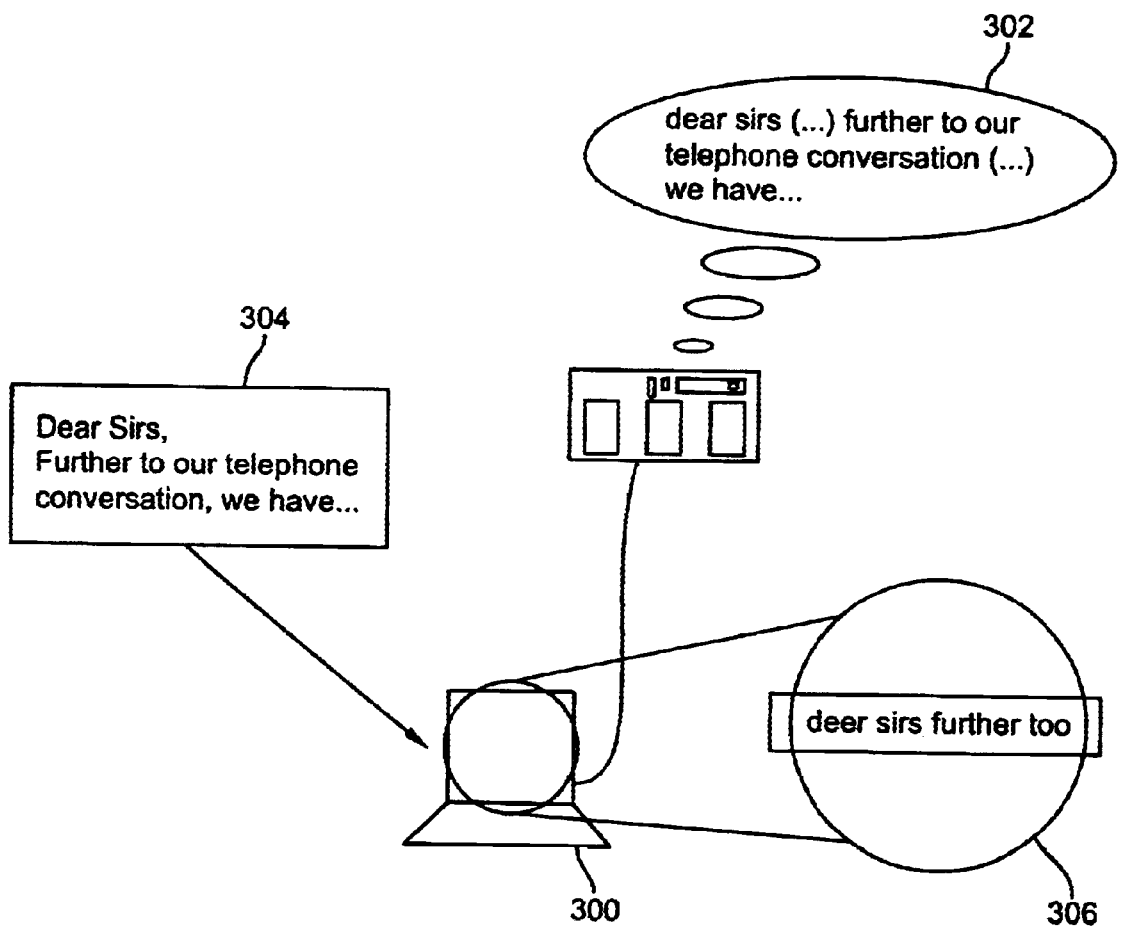
FIG. 3 is a schematic block diagram of an alternate embodiment of the present invention.

FIG. 3 is a schematic block diagram of an alternate embodiment of the present invention. In this single-machine version, the text-to-speech device and the speech recognition device have been incorporated into a unique system 300. Essentially, the loudspeaker and the microphone of the previous embodiment have been deleted.

The complete process is run in two successive steps. In a first step, an audio file 302 including the reference text 304 in digital form is generated by a text-to-speech computer-implemented program. In a second step, the speech recognition operation is performed over the audio file to generate a decoded text 306. As previously mentioned, the capability of the speech recognition device is then evaluated by measuring the matching of the decoded text and the reference text.

The advantages of this embodiment are mainly that the audio file is available only in digital form that prevents any external disturbances due to ambient noise or channel distortions of the loudspeaker, the microphone or the sound card. Moreover, audio files may be generated much faster by the text-to-speech program than in real-time and the digital text may be decoded much faster by the speech recognition program than in real-time. Consequently, the apparatus and method of the present embodiment greatly improve the performance of the system.

Figure 4:
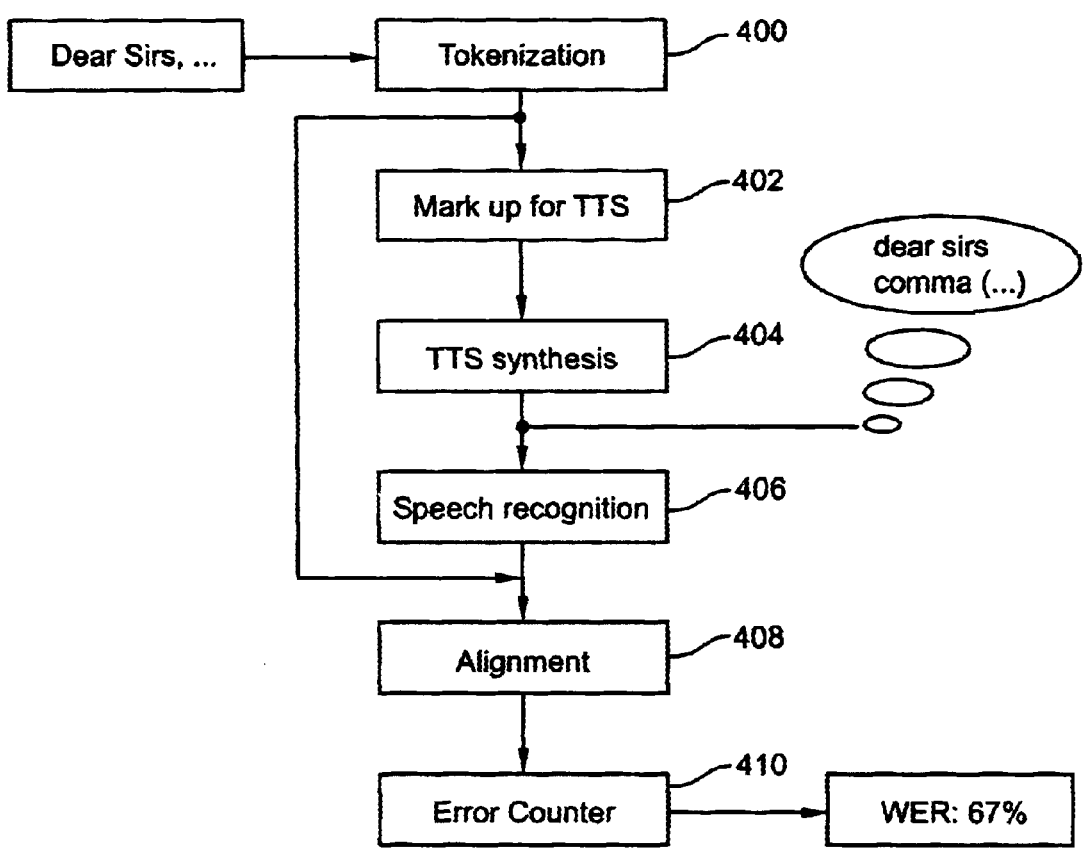
FIG. 4 is a flow diagram describing one embodiment of a method of the present invention.

FIG. 4 is a flow diagram describing one embodiment of a method of the present invention. In a first step 400, a well-known tokenization operation is performed on an initial text that has been stored on a storage area of a computer on which is implemented the system of the invention. The initial text has been properly typed, capitalized and punctuated in order that the result of the tokenization step be an identification of the real words, the punctuation marks, any special words such as numbers and so on. The tokenized text will be further used as the reference text during the alignment step 408.

In a second step 402, the tokenized text is adapted to be formatted for the text-to-speech synthesis operation that is performed in step 404. The adaptation comprises replacing the punctuation symbols by their corresponding word such as a comma being replaced by the word 'comma.' Some other changes are also made to the text to include the prosody markers in order that the text-to-speech synthesizer reads the tokenized text as naturally as possible. For example, a dictated comma can be surrounded by two non-spoken commas that will be restored as brief pauses by the synthesizer around the spoken punctuation, or a punctuation full-stop will be left marked by a comma that will be restored as a brief pause, and right marked by a non-speakable full-stop that will be restored by a drop in pitch and a longer pause.

It is to be noted here that the invention is not bound to specific techniques of tokenization and mark-up and is operable with any of the known techniques.

Referring now to step 404, the synthesis of the marked text is performed by the text-to-speech program and a digital form of the audio is generated.

In next step 406, speech recognition is performed on the digital file to output a decoded text. Next, an alignment operation is accomplished in step 408 to identify the common and the different portions between the reference text issued from step 400 and the decoded text issued from step 406.

In step 410, a counting operation counts the number of words in the reference text and the number of mistakes in the decoded text (also called words in error) to generate an error report from which various measurements may be derived. The error report generally contains the number of insertions, i.e., words that are absent from the reference text but are present in the decoded text; the number of deletions, i.e., words that have been missed by the speech recognizer; and the number of substitutions, i.e., words that have been misrecognized and decoded as a different word (such as dear being decoded as deer). Finally, for example, a measurement commonly made is the word error rate (the famous WER) which is the ratio of the total number of errors to the number of reference words.

Figure 5:
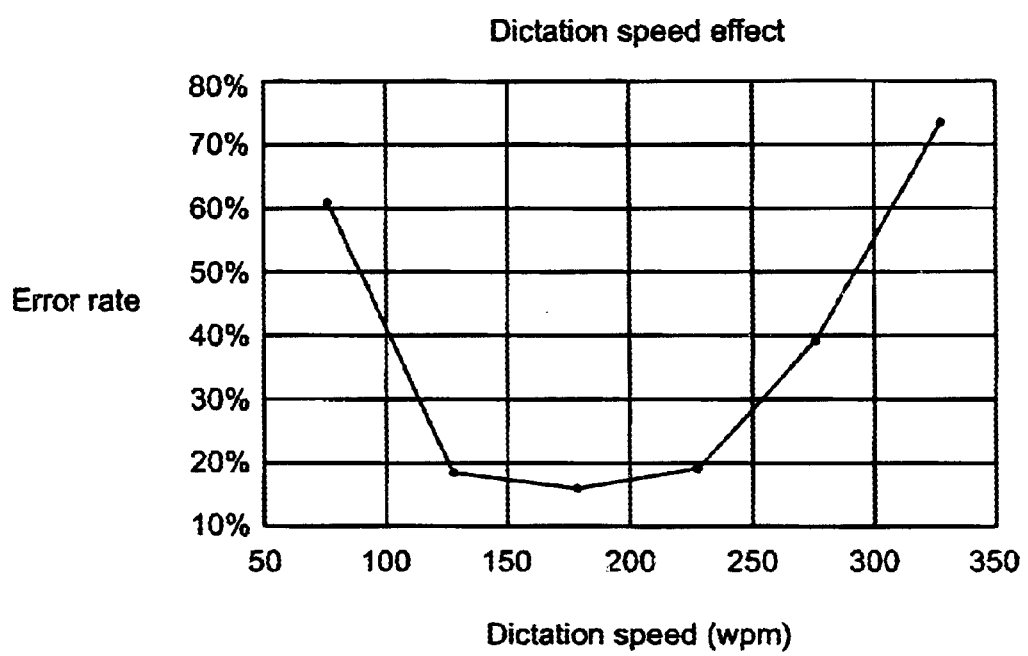
FIG. 5 shows an example of measurements obtained with the present invention.

FIG. 5 shows an example of a specific test measuring the impact of speech dictation delivery speed on the error rate. The arrangement for this test uses the system as shown on FIG. 3.

Although the results are shown for illustration only and should not be over-interpreted, it is readily apparent that such results could not be obtained by human speakers who cannot control their speed of dictation in an accurate way like a speech synthesizer.

It is to be appreciated that each computer system, as mentioned above, for implementing the invention may comprise a processor for controlling and performing the operations described herein. The term "processor" as used herein is intended to include any processing device, such as, for example, one that includes a CPU (central processing unit) or other suitable processing circuitry. For example, the processor may be a digital signal processor, as is known in the art. Also the term "processor" may refer to more than one individual processor. The computer system may also comprise memory. The term "memory" as used herein is intended to include memory associated with a processor or CPU, such as, for example, RAM, ROM, a fixed memory device (e.g., hard drive), a removable memory device (e.g., diskette), flash memory, etc. In addition, the computer system may comprise one or more other user interfaces in addition to the ones mentioned above. The phrase "user interface" as used herein is intended to include, for example, one or more input devices, e.g., keyboard, for inputting data to the processing unit, and/or one or more output devices, e.g., CRT display and/or printer, for providing results associated with the processing unit.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the invention may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although the present invention and its advantages have been described in detail, it should be understood that various changes, substitutions and alterations can be made herein without departing from the spirit and scope of the invention as defined by the appended claims.

What is claimed is:

1. A method for testing speech recognition systems, the method comprising the steps of:

a) generating a digital audio file from a reference text using a text-to-speech device, the digital audio file being stored within a storage area of a computer system; and b) reading the digital audio file using a speech recognition device to generate a decoded text representative of the reference text.

2. The method of claim 1, wherein the text-to-speech device and the speech recognition device are implemented within a single computer system.

3. The method of claim 1, wherein the step of generating the digital audio file further comprises the steps of:

a1) tokenizing an initial text stored on a storage area of the computer system to generate a tokenized text;

a2) marking-up of the tokenized text to generate a marked text; and a3) synthesizing the marked text to generate the digital audio file.

4. The method of claim 1, further comprising the steps of:

c) processing an alignment operation between the reference text and the decoded text; and d) generating an error report representative of a recognition rate of the speech recognition device.

5. Apparatus for testing speech recognition systems, the apparatus comprising:

at least one processor operative to: (a) generate and store a digital audio file from a reference text using a text-to-speech process; and (b) read the digital audio file using a speech recognition process to generate a decoded text representative of the reference text.

6. An article of manufacture for testing speech recognition systems, comprising a machine readable medium containing one or more programs which when executed implement the steps of:

a) generating a digital audio file from a reference text using a text-to-speech device, the digital audio file being stored within a storage area of a computer system; and b) reading the digital audio file using a speech recognition device to generate a decoded text representative of the reference text.

7. A method for testing speech recognition systems, the method comprising the steps of:

a) generating a synthetic speech from a reference text using a text-to-speech device; and b) processing the synthetic speech using a speech recognition device to generate a decoded text representative of the reference text.

8. The method of claim 7, wherein the text-to-speech device is implemented within a first computer system and the speech recognition device is implemented within a second computer system.

9. The method of claim 8, wherein the step of processing the synthetic speech further comprises the steps of:

b0) synthesizing the speech into audible audio using an audio output device connected to the first computer system;

b1) recording the synthetic speech using an audio input device connected to the second computer system to generate an audio file; and b2) recognizing the recorded audio file to output the decoded text.

10. The method of claim 9, wherein the step of generating an audio file further comprises the steps of:

a1) tokenizing an initial text stored on a storage area of a computer system to generate a tokenized text;

a2) marking-up of the tokenized text to generate a marked text; and a3) synthesizing the marked text to generate the audio file.

11. The method of claim 7, further comprising the steps of:

c) processing an alignment operation between the reference text and the decoded text; and d) generating an error report representative of a recognition rate of the speech recognition device.

12. Apparatus for testing speech recognition systems, the apparatus comprising:

at least one processor operative to generate a synthetic speech from a reference text using a text-to-speech process; and at least a second processor operative to process the synthetic speech using a speech recognition process to generate a decoded text representative of the reference text.

13. An article of manufacture for testing speech recognition systems, comprising a machine readable medium containing one or more programs which when executed implement the steps of:

a) generating a synthetic speech from a reference text using a text-to-speech device; and b) processing the synthetic speech using a speech recognition device to generate a decoded text representative of the reference text.

* * * * *